Figure 1:
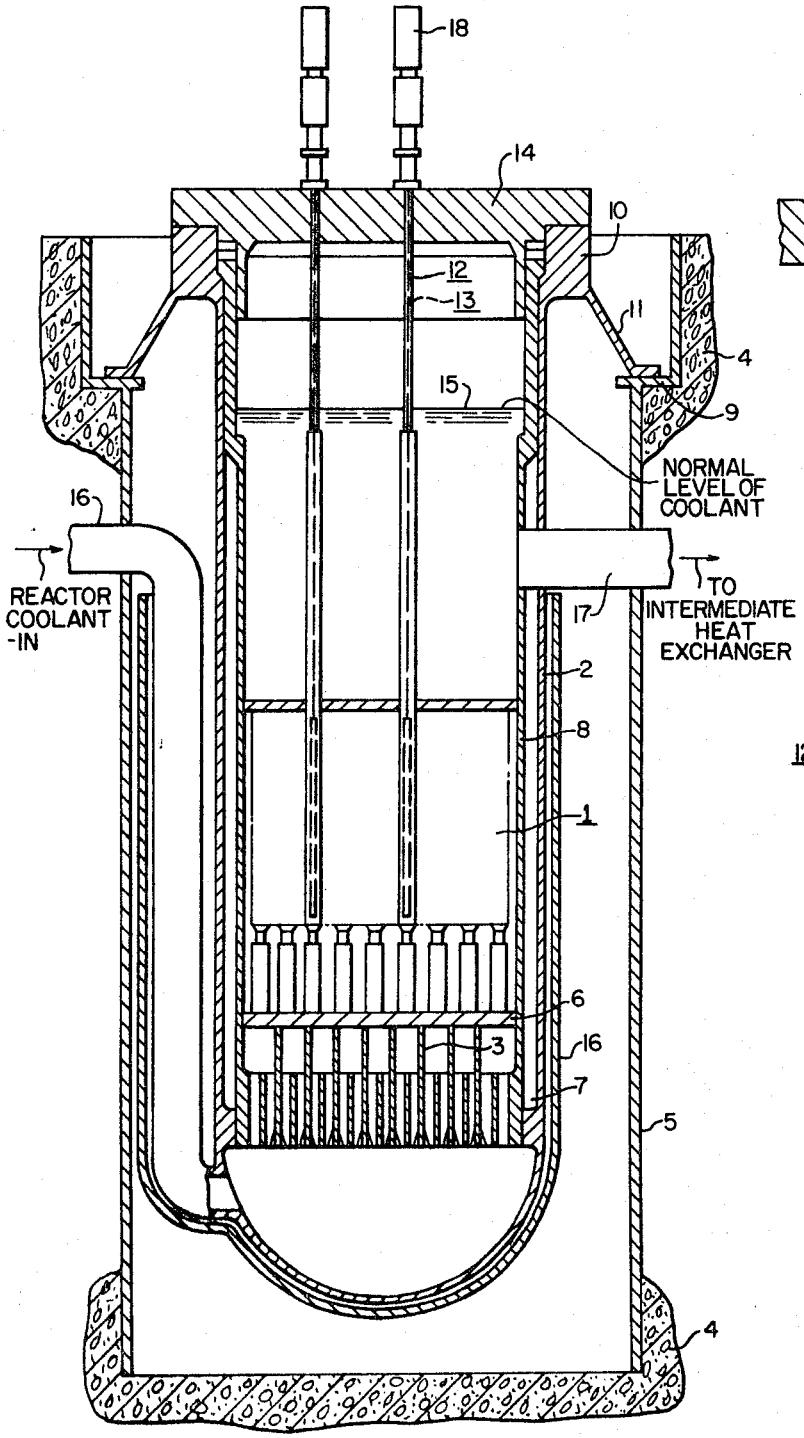
Figure 2:
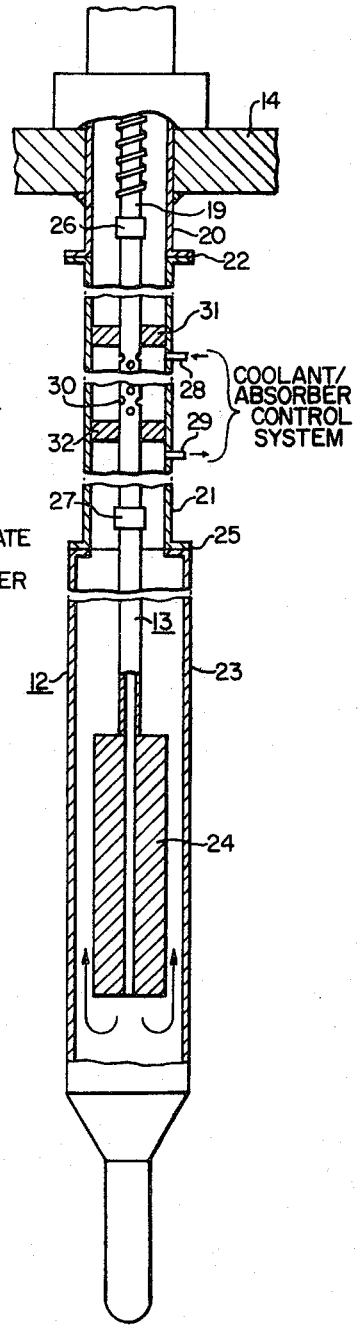
Figure 3:
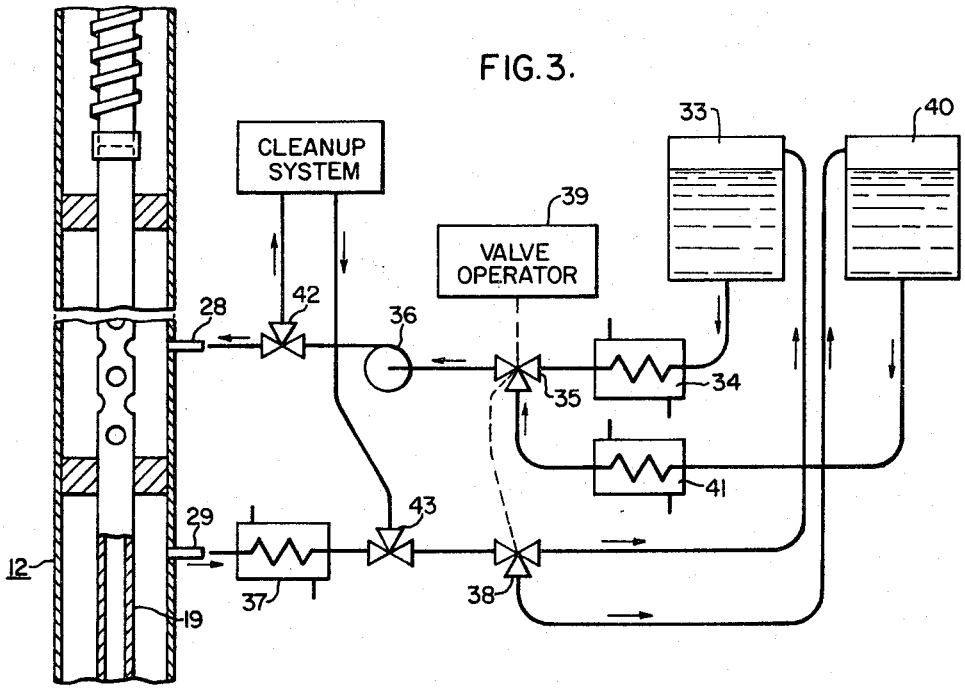
Figure 4:
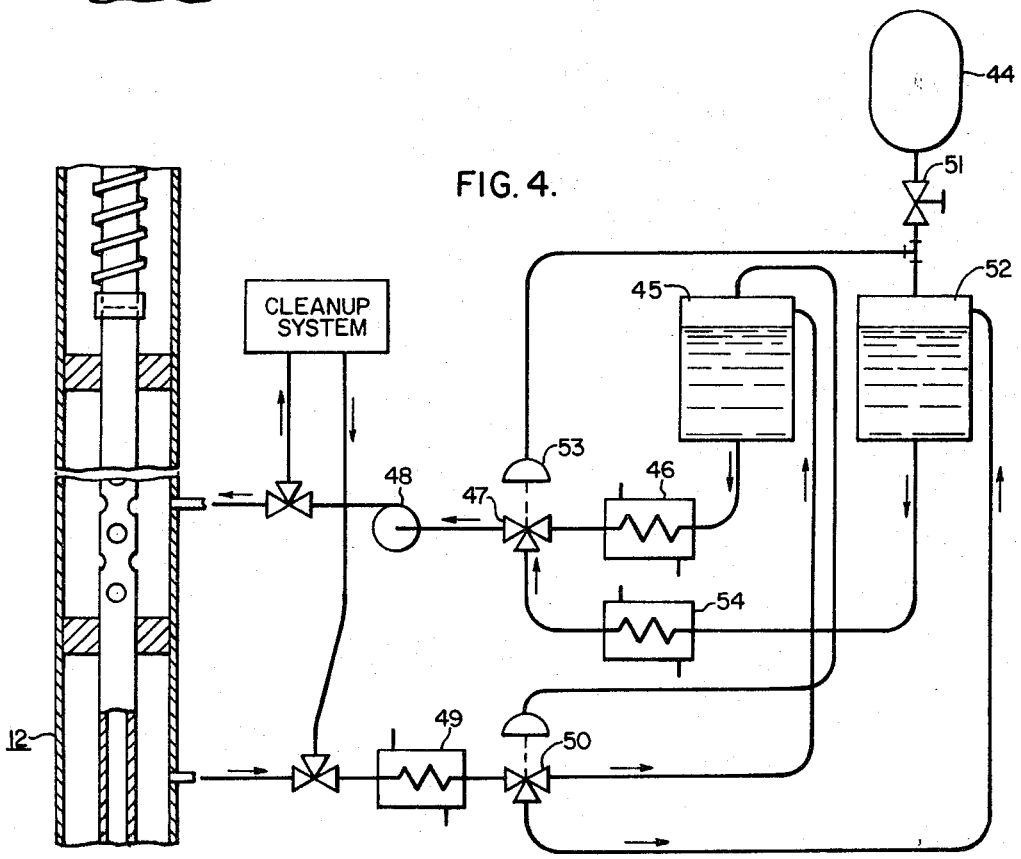

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 17, 1973

909 O.G. 796

T909,020

COMBINED SOLID AND LIQUID SYSTEM FOR CONTROLLING NUCLEAR REACTORS

Reinhard Froelich, Scottdale, and Howard W. Yant, Greensburg, Pa., assignors to Westinghouse Electric Corporation, Pittsburgh, Pa.

Filed June 30, 1972, Ser. No. 267,812

Int. Cl. G21c *17/10*

U.S. Cl. 176—86 R

2 Sheets Drawing. 16 Pages Specification

A control system for a nuclear reactor comprising hollow mechanically operated control rods and a liquid neutron absorber which may be circulated through the hollow control rods. The liquid neutron absorber provides the nuclear reactor with a redundant safety system to deactivate the reactor.

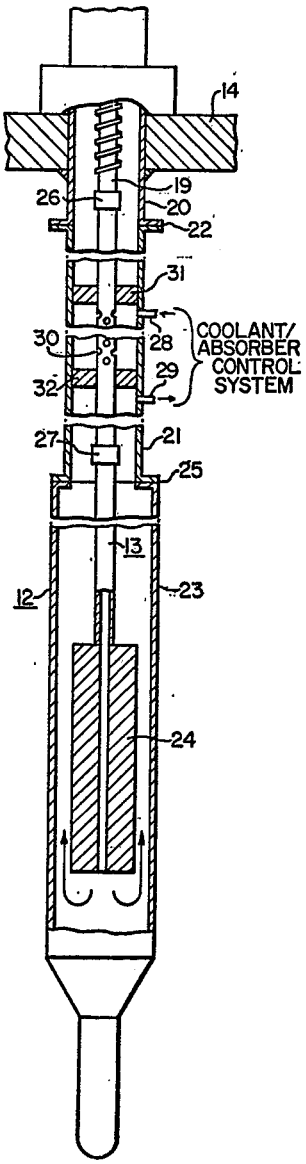

COMBINED SOLID AND LIQUID SYSTEM FOR CONTROLLING NUCLEAR REACTORS

Filed June 30, 1972 2 Sheets-Sheet 1